United States Patent [19]
Crema

[11] Patent Number: 4,711,545
[45] Date of Patent: Dec. 8, 1987

[54] FILM ADVANCE MECHANISM

[75] Inventor: Rolf Crema, Ehringshausen-Greifenthal, Fed. Rep. of Germany

[73] Assignee: Ernst Leitz Wetzlar GmbH, Wetzlar, Fed. Rep. of Germany

[21] Appl. No.: 887,427

[22] Filed: Jul. 21, 1986

[30] Foreign Application Priority Data

Aug. 19, 1985 [DE] Fed. Rep. of Germany ....... 3529618

[51] Int. Cl.$^4$ .............................................. G03B 1/02
[52] U.S. Cl. ..................................... 354/213; 354/206
[58] Field of Search ................. 354/206, 213, 204, 205

[56]     References Cited
U.S. PATENT DOCUMENTS

| 2,241,122 | 5/1941 | Drotning | 354/213 |
| 2,838,984 | 6/1958 | Lareau et al. | 354/213 |
| 3,486,431 | 12/1969 | Ettischer | 354/213 |
| 4,209,246 | 6/1980 | Nomura et al. | 354/206 |
| 4,339,189 | 7/1982 | Nakano | 354/213 |

FOREIGN PATENT DOCUMENTS 2930575 3/1980 Fed. Rep. of Germany .
3222985 12/1982 Fed. Rep. of Germany .

Primary Examiner—A. A. Mathews
Attorney, Agent, or Firm—Schwartz, Jeffery, Schwaab, Mack, Blumenthal & Evans

[57]     ABSTRACT

In a film advance mechanism for perforated film, locking elements are provided to guarantee the image position for each exposure. They block the film transport sprocket against further movement after completion of each full film advance carried out via the camera winding mechanism. In addition, the mechanism releases the film transport sprocket from the blocked condition on completion of the camera shutter cycle.

8 Claims, 1 Drawing Figure

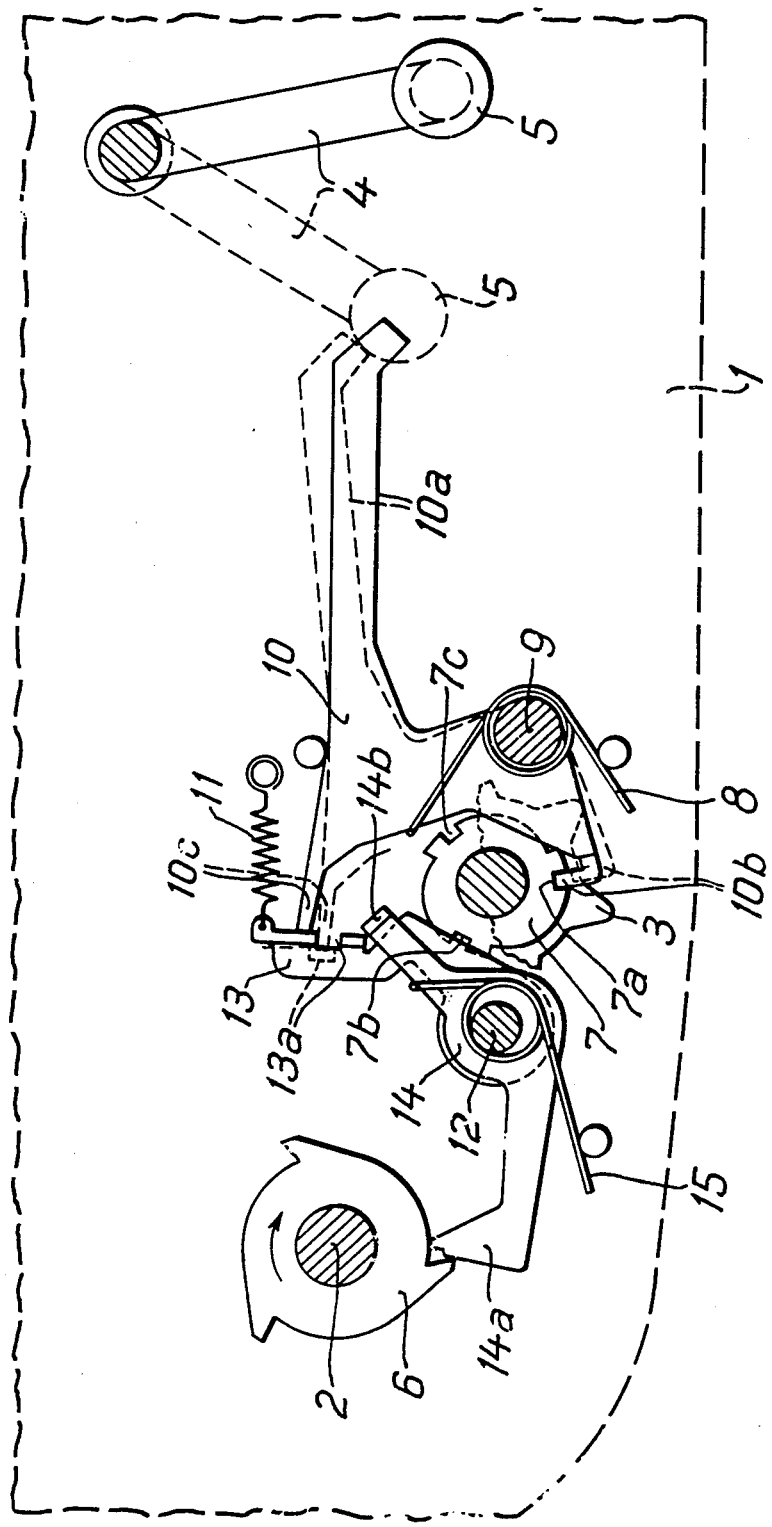

FILM ADVANCE MECHANISM

BACKGROUND OF THE INVENTION

The present invention relates to a film advance mechanism for perforated film in photographic cameras.

Devices of this type usually serve to transport the film through a certain distance, dependent on the image format, after each exposure. In order to always achieve the same spacing between exposures, it is known that a film transport sprocket, which acts together with a ratchet mechanism, engages in the film perforation. Besides the disadvantage that, in this type of device, the film undergoes a shear stress, an exact position of the film is also not guaranteed by the freely rotating film transport sprocket.

In German Offenlegungsschrift No. 3,222,985, a device has therefore already been proposed in which a centering pin, controlled by the film movement itself and by the flash synchronization contact on the camera, engages in the perforation of the film. Control of such a device is technically complicated. In addition, the shear stress of the film increases, which results in frequent tearing of the perforation holes with the result that the film can no longer be advanced.

SUMMARY OF THE INVENTION

It is therefore an object of the present invention to provide an improved film advance mechanism. It is a particular object of the invention to provide a film advance mechanism which, while technically uncomplicated, ensures that the image edges, after each film advance, always adopt and maintain the same position relative to the edges of the image aperture for each type of film advancer (winder, drive or manual advancer).

In accomplishing the foregoing objects, there has been provided a film advance mechanism for producing a uniform image position of perforated film in a photographic camera for each successive exposure, comprising: a film transport sprocket engaging with the film perforations; means for locking the film transport sprocket against further movement after completion of each full film advance; and means for releasing the film transport sprocket from a locked condition on completion of a camera shutter cycle. Preferably, the locking means comprises means, responsive to a film winding mechanism on the camera, for locking the film transport sprocket toward the end of the film advance; and a profiled locking mechanism comprising a detent wheel mounted on the film transport sprocket, a detent lug and means for engaging the detent lug in the detent wheel at the end of a film advance. Preferably, the releasing means comprises a roller operatively connected with the camera shutter such that the roller lifts the detent lug out of the detent wheel after completion of the shutter cycle.

BRIEF DESCRIPTION OF THE DRAWINGS

An illustrative embodiment of the invention is represented schematically in the drawing and is described in further detail below.

In the FIGURE, the outline of a body 1 of a photogrgaphic camera is indicated by the dashed line. For reasons of clarity, only the components according to the invention are represented which work together with conventional elements of a film advance device.

DETAILED DESCRIPTION OF THE PREFERRED EMBODIMENTS

In a film advance device of the initially mentioned type, to guarantee the image position in each case, (a) locking elements are provided which lock the film transport sprocket against further movement after completion of each full film advance carried out via the camera winding mechanism, and (b) means are present which release the film transport sprocket from its locked condition on completion of the camera shutter cycle.

Furthermore, additional locking members are present which are controlled by the camera winding mechanism and only release the action of the locking elements toward the end of the film advance.

The conventional components are the shutter tensioning mechanism, of which only a winding shaft 2 is shown, a film transport sprocket 3 and a pivoting lever 4, which is connected to a shutter element (not illustrated) and which carries a roller 5 at its free end.

The components according to the invention include a cam disk 6, which is mounted securely on the winding shaft 2, a detent wheel 7, which is connected rigidly to the film transport sprocket 3, a detent pawl 10, which is under the pressure of a leg spring 8 and can be pivoted about a pin 9, a catch lever 13, which is pulled by a coil spring 11 and is movable about a bearing pin 12, and a counterrotation catch 14, designed as an angle lever, with lever arms 14a and 14b, which is prestressed by a leg spring 15 and which also lies on the bearing pin 12.

The present invention functions as follows: assume that the exposure is completed and that the camera shutter, which is not described here in further detail, has operated; the swiveling lever 4 and the roller 5 carried by the swiveling lever have then moved into the position represented in the drawing by the dashed line. By means of pressure by the roller 5 against an end 10a, projecting to the right in the drawing and designed as a lever, of the detent pawl 10, this detent pawl 10 is swiveled about the pin 9 against the force of the spring 8 into the position shown by the dashed line. The detent lug 10b of the detent pawl 10, which is hitherto engaged in one of the detent grooves 7a, 7b or 7c, thereby lifts out of the detent groove and releases the rotation of the transport sprocket 3. Simultaneously, however, a catch lug 10c of the detent pawl 10, pointing to the left in the drawing, is caught and held by a groove 13a of the catch lever 13. The arresting operation is caused by the spring 15 via the lever arm 14b of the counterrotation catch 14, which is frictionally connected to the catch lever 13 by means of spring pressure. This arrested condition is maintained—and thus, so is the free rotation of the transport sprocket 3 possible—until another film avdance has been completed and the camera shutter has been tensioned again.

To advance the film, a film transport lever or other conventional mechanism (not illustrated) is actuated. The winding shaft 2, and hence also the cam disk 6, thereby rotates in the direction of the arrow. The counterrotation catch 14, the lever arm 14a of which lies against the cam disk 6, is thereby moved against the force of the spring 15. The catch lever 13 follows the lever arm 14a of the counterrotation catch 14 under the tension of the coil spring 11. The catch lug 10c of the detent pawl 10 can thus slide out of the detent groove 13a. It is then again movable about the pin 9. The spring 8 now forces the detent pawl 10 in a clockwise direction and causes the detent lug 10b to engage in one of the detent grooves 7a–c, the film transport sprocket 3 thus being secured against rotation in both directions.

This catch device guarantees an exact position of the image in relation to the edges of the image aperture of the camera. As is well understood by the artisan, the mechanism of the film advance device always transports the film through one complete image length and is synchronized with the transport sprocket 3 and the detent wheel 7 connected to the transport sprocket 3 in such a way that one of the detent grooves 7a–c always lies opposite the detent lug 10b of the detent pawl 10 after completion of the advance. Similarly, the cam disk 6 has a shape which controls the release of the detent pawl 10 (which serves for blocking the film transport sprocket) only just before the end of the film advance.

What is claimed is:

1. A film advance mechanism for producing a uniform image position of perforated film in a photographic camera for each successive exposure, comprising:
 a film transport sprocket engaging with the film perforations;
 a profiled locking mechanism responsive to a film winding mechanism on the camera for locking the film transport sprocket toward the end of each film advance, the profiled locking mechanism comprising a detent wheel mounted on the film transport sprocket, a detent lug and means for engaging the detent lug in the detent wheel at the end of each film advance; and
 a roller operatively connected with the camera shutter and the detent lug such that the roller lifts the detent lug out of the detent wheel after completion of a camera shutter cycle.

2. A film advance mechanism for producing a uniform image position of perforated film in a photographic camera for each successive exposure, comprising:
 a film transport sprocket engaging with the film perforations;
 a film winding mechanism;
 a roller operatively connected with the camera shutter;
 a detent wheel mounted on the film transport sprocket;
 a lever rotatable about a pivot point, the lever including a detent lug for engaging the detent wheel, a catch lug and an arm which is contactable by the roller to initiate rotation of the lever about the pivot point upon release of the camera shutter;
 spring means for rotatably biasing the lever into a position in which the detent lug rests in the detent wheel;
 a catch lever rotatable about a pivot point and having a catch means for engaging the catch lug, whereby the catch lug is engaged and held by the catch means upon rotation of the lever by the roller; and
 a counter revolution catch associated with the film winding mechanism and operable to move the catch lever at the end of each film advance away from the catch lug so as to release the catch lug, whereby the detent lug returns into engagement with the detent wheel.

3. A film advance mechanism for producing a uniform image position of perforated film in a photographic camera for each successive exposure, comprising:
 a film transport sprocket engaging with the film perforations;
 means for locking the film transport sprocket against further movement after completion of each full film advance;
 a film winding mechanism; and
 means for holding the locking means out of engagement with the film transport sprocket, the holding means operatively connected to the film winding mechanism and to the camera shutter, the holding means being adapted to move the locking means out of a locked position with the film transport sprocket at the end of each camera cycle and to return the locking means to a locked position with the film transport sprocket after each full film advance whereby the film transport sprocket is placed in an unlocked condition for each film advance following each camera shutter cycle.

4. A film advance mechanism as claimed in claim 3, wherein the locking means comprises a detent wheel mounted on the film transport sprocket and a detent lug engageable with the detent wheel.

5. A film advance mechanism as claimed in claim 3, wherein the cam follower comprises a catch lever pivotable about a pin and a counter rotation catch associated with the film winding mechanism and operable to move the catch lever at the end of each film advance.

6. A film advance mechanism as claimed in claim 3, wherein the holding means comprises a lever connected to the locking means and rotatable about a pivot point, a cam mounted on the film winding mechanism and a cam follower pivotable about a pin and constrained to follow the cam, the cam follower being adapted to engage the lever at the end of each camera shutter cycle so as to move the locking means out of a locked position with the film transport sprocket.

7. A film advance mechanism as claimed in claim 3 wherein the means for locking the film transport sprocket locks the film transport sprocket against movement in either a clockwise or a counterclockwise direction.

8. A film advance mechanism as claimed in claim 3, wherein the means for locking directly locks the film transport sprocket.

* * * * *